United States Patent
Cohen et al.

(10) Patent No.: US 10,404,779 B2
(45) Date of Patent: Sep. 3, 2019

(54) CLOUD ASSISTED MANAGEMENT OF DEVICES

(71) Applicant: SCHNEIDER ELECTRIC IT CORPORATION, West Kingston, RI (US)

(72) Inventors: Daniel C. Cohen, Newtonville, MA (US); Colm McCauley, Galway (IE); Alan Dean Smith, Galway (IE); Maarten Janson, Galway (IE)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 189 days.

(21) Appl. No.: 15/219,843

(22) Filed: Jul. 26, 2016

(65) Prior Publication Data

US 2018/0034888 A1     Feb. 1, 2018

(51) Int. Cl.
| | |
|---|---|
| H04L 29/08 | (2006.01) |
| H04L 12/24 | (2006.01) |
| H04L 29/06 | (2006.01) |
| H04W 12/06 | (2009.01) |
| H04W 4/70 | (2018.01) |
| H04L 9/32 | (2006.01) |
| H04L 12/26 | (2006.01) |

(52) U.S. Cl.
CPC ......... *H04L 67/025* (2013.01); *H04L 9/3213* (2013.01); *H04L 41/046* (2013.01); *H04L 63/06* (2013.01); *H04L 63/061* (2013.01); *H04L 63/083* (2013.01); *H04L 63/0838* (2013.01); *H04L 63/102* (2013.01); *H04L 67/10* (2013.01); *H04L 67/12* (2013.01); *H04L 67/146* (2013.01); *H04L 69/329* (2013.01); *H04W 4/70* (2018.02); *H04W 12/06* (2013.01); *H04L 41/0213* (2013.01); *H04L 41/0226* (2013.01); *H04L 41/12* (2013.01); *H04L 43/0817* (2013.01); *H04Q 2209/40* (2013.01); *H04Q 2209/60* (2013.01)

(58) Field of Classification Search
None
See application file for complete search history.

(56) References Cited

U.S. PATENT DOCUMENTS

| | | |
|---|---|---|
| 6,640,140 B1 | 10/2003 | Lindner et al. |
| 7,100,054 B2 | 8/2006 | Wenisch et al. |

(Continued)

FOREIGN PATENT DOCUMENTS

| | | |
|---|---|---|
| EP | 1380377 A2 | 1/2004 |
| WO | 2015103048 A1 | 7/2015 |

OTHER PUBLICATIONS

Extended European Search Report from corresponding European Application No. 17181058.3 dated Aug. 25, 2017.

(Continued)

*Primary Examiner* — Thomas J Dailey
(74) *Attorney, Agent, or Firm* — Lando & Anastasi, LLP

(57) ABSTRACT

A managed device is provided that includes a network interface, a controller, and a module to provide manageable operations of the device. The controller communicates with at least one of a cloud service or an agent to send an identifier and to receive a token from the cloud service or the agent. The controller validates the token and receives management information from the cloud service.

19 Claims, 5 Drawing Sheets

(56) References Cited

U.S. PATENT DOCUMENTS

| | | |
|---|---|---|
| 7,446,433 B2 | 11/2008 | Masciarelli et al. |
| 7,711,814 B1 | 5/2010 | Emerick et al. |
| 7,796,589 B2 | 9/2010 | Cohen et al. |
| 8,476,787 B2 | 7/2013 | Spitaels et al. |
| 8,595,524 B2 | 11/2013 | Kamijima |
| 8,819,170 B2 | 8/2014 | Cohen et al. |
| 2002/0091815 A1 | 7/2002 | Anderson et al. |
| 2002/0138785 A1 | 9/2002 | Hammond et al. |
| 2004/0215693 A1 | 10/2004 | Thompson |
| 2005/0035105 A1 | 2/2005 | Spear et al. |
| 2005/0268122 A1 | 12/2005 | Young et al. |
| 2006/0050465 A1 | 3/2006 | Cho et al. |
| 2006/0206741 A1 | 9/2006 | Allison et al. |
| 2008/0077425 A1 | 3/2008 | Johnson et al. |
| 2010/0115065 A1 | 5/2010 | Thompson |
| 2010/0250160 A1 | 9/2010 | Spitaels et al. |
| 2010/0250162 A1 | 9/2010 | White et al. |
| 2011/0054710 A1 | 3/2011 | Imes et al. |
| 2013/0018979 A1 | 1/2013 | Cohen et al. |
| 2014/0075513 A1* | 3/2014 | Trammel ............... H04L 9/3213 726/4 |
| 2014/0258526 A1 | 9/2014 | Le Sant et al. |
| 2015/0012763 A1 | 1/2015 | Cohen et al. |
| 2016/0026201 A1 | 1/2016 | Vellanki et al. |
| 2017/0086012 A1* | 3/2017 | Jimenez .................. H04W 4/70 |
| 2017/0118028 A1* | 4/2017 | Hayes ................... G06F 3/0622 |
| 2017/0230825 A1* | 8/2017 | Counterman ......... H04W 12/06 |
| 2017/0264527 A1* | 9/2017 | Jain ......................... H04L 43/50 |

OTHER PUBLICATIONS

International Search Report and the Written Opinion of the International Searching Authority from PCTUS2011/068113 dated Apr. 30, 2012.

Extended European Search Report from European Application No. 11878777.9 dated May 3, 2016.

* cited by examiner

CLOUD ASSISTED MANAGEMENT OF DEVICES

BACKGROUND

1. Field of Disclosure

At least some embodiments described herein relate generally to remote management infrastructure and, more particularly, to managing and authenticating devices via cloud services.

2. Discussion of Related Art

Device management systems and services provide customers an ability to control and configure devices on their network. In conventional management, the systems and devices being managed will typically implement a web service and present a management interface to a user via a web page, or may implement a protocol such as Simple Network Management Protocol (SNMP) which can be complex and costly to incorporate. In either of these and other cases, the user management interface requires the managed device to have additional components, software, memory, complexity, and expense to support a user interface for management, control, and reporting directly to a user or a client process (such as an SNMP agent or a web browser).

SUMMARY

Various aspects of the present disclosure relate to methods and apparatuses for local or remote management of devices via a cloud service.

According to one aspect, a managed device is provided and includes at least one module configured to provide manageable operations of the managed device; a network interface; and a controller coupled to the network interface and the at least one module. The controller is configured to communicate with at least one of a cloud service or an agent via the network interface, send an identifier of the managed device to at least one of the cloud service or the agent, receive one or more tokens from at least one of the cloud service or the agent, validate the one or more tokens, and receive management information from the cloud service.

According to embodiments, the controller is configured to control the at least one module based on the management information. In embodiments, the controller is further configured to receive authorization from a user before at least one of communicating, sending an identifier, and validating the one or more tokens. In embodiments, communication with at least one of the cloud service or the agent occurs using a first protocol that is a machine-to-machine protocol. In embodiments, the one or more tokens includes at least one of a cryptographic token and a timed token. In embodiments, the controller is further configured to send a confirmation to at least one of the cloud service or the agent, based upon successfully validating the one or more tokens. In embodiments, the controller is further configured to send the identifier of the managed device in response to a discovery message received from at least one of the cloud service or the agent.

According to another aspect, a method of managing a managed device is provided and includes communicating, by the managed device, with at least one of a cloud service or an agent, via a network interface; sending, by the managed device, an identifier of the managed device to at least one of the cloud service or the agent; receiving, by the managed device, one or more tokens from at least one of the cloud service or the agent; validating the one or more tokens, by the managed device; and receiving management information, by the managed device, from the cloud service.

In some embodiments, the method includes controlling an operation of the managed device based on the management information. In some embodiments, at least one of communicating, sending an identifier, and validating the one or more tokens is contingent upon receiving authorization from a user. In some embodiments, receiving management information from the cloud service occurs using a first protocol that is a machine-to-machine protocol. In some embodiments, the one or more tokens includes at least one of a cryptographic token and a timed token. In some embodiments the method includes sending a confirmation to at least one of the cloud service or the agent, based upon successfully validating the one or more tokens. In embodiments, sending the identifier of the managed device is in response to a discovery message received from at least one of the cloud service or the agent.

According to another aspect, a method of managing a managed device includes receiving, over a network, an identifier of the managed device; associating an agent with the managed device; receiving management information over the network from the agent using a first protocol; and providing the management information over the network to the managed device using a second protocol different from the first protocol.

According to an embodiment, associating the agent with the managed device includes providing one or more tokens to at least one of the agent and the managed device. In embodiments, the one or more tokens includes at least one of a cryptographic token and a timed token. In embodiments, the first protocol is one of a network management protocol and a hypertext transfer protocol and the second protocol is a machine-to-machine protocol. In embodiments, associating an agent with the managed device includes authenticating a user of the agent. In embodiments, associating an agent with the managed device includes determining capabilities of the managed device.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying drawings, which are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
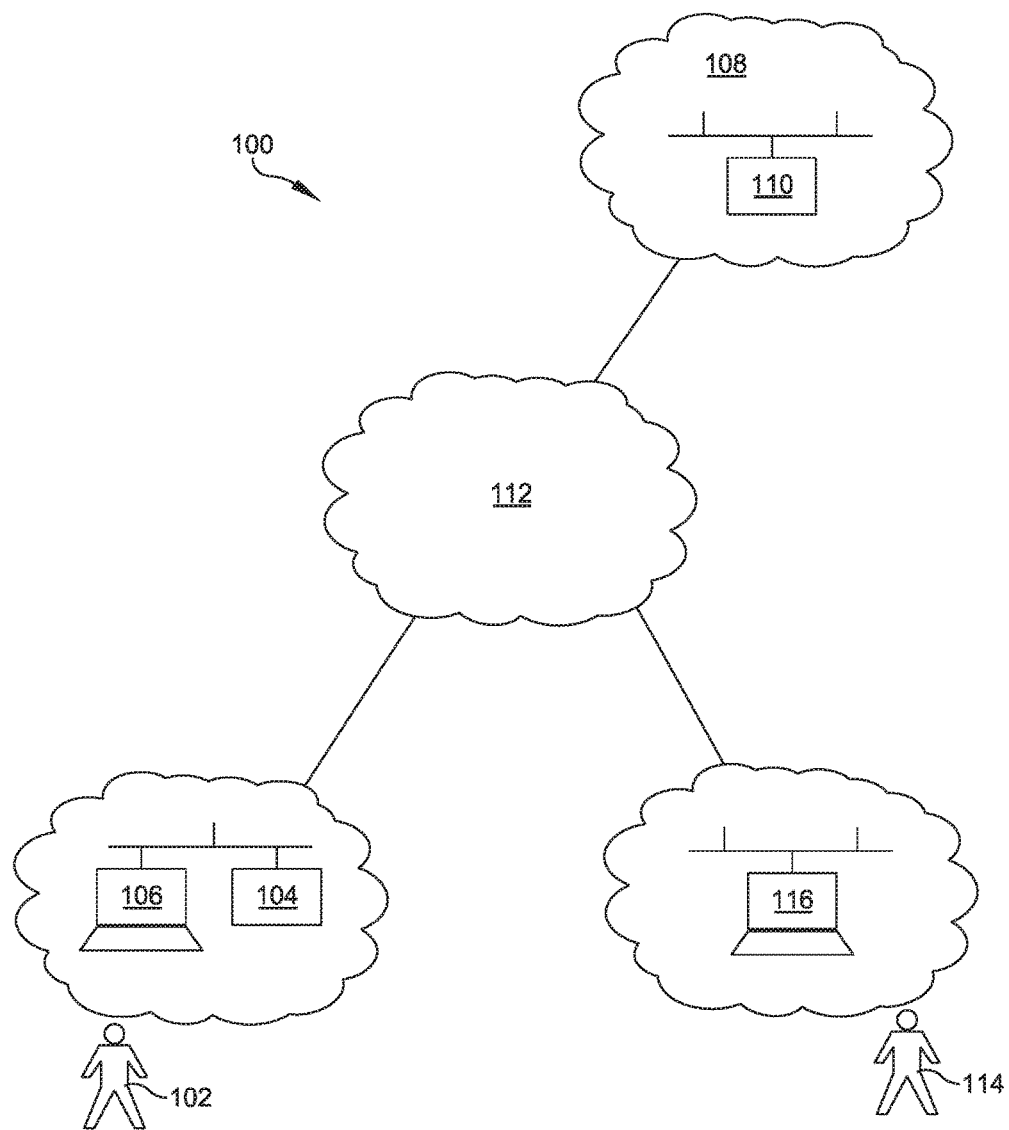
FIG. 1 is a schematic diagram of a cloud-based management system including a cloud managed device.

There exists a need for a less complex and light weight device management architecture that allows managed devices to implement simple interfaces at lower cost while maintaining a robust user experience and capability. At least one embodiment disclosed herein includes apparatus and processes for implementing a cloud-based management model that simplifies and decreases the overall cost of managing hardware devices. For example, according to one embodiment, the cost of individual managed devices is reduced by manufacturing, configuring, and managing the devices with little or no resources on the device dedicated to performing user interface functions. For example, user interface functions conventionally performed by the device are instead performed by applications executing within a cloud service.

In embodiments, one or more managed devices participates in a cloud-based management system to exchange identity, configuration, and other management information with a cloud service, a management agent, and a user. This information may include performance, status, control, environmental, and other information of a managed device. Additionally, the cloud service communicates command and control information to the managed device, and according to some embodiments the cloud service presents a robust management interface to a management agent, and also may present a user interface to users, who may be local, in the vicinity of the managed device, or may be remote from the managed device.

In some embodiments, the cloud service receives and aggregates management information into data storage, such as a data warehouse, for analysis and reporting. This information may be used by product management and support personnel to gain insight into how customers use the managed devices and how the managed devices perform in the field, thereby informing their product roadmaps and call resolution activities. In addition, this information may be used to analyze controlled equipment, industrial process performance, energy usage, battery performance, environmental conditions, and other information accessible to managed devices.

In accordance with some aspects, a cloud-based management system may follow a framework method of discovering devices, associating users with the devices, and managing the devices. Devices may be discovered by various discovery methods described below, including by cloud-aware devices that automatically report their existence to a cloud management service. Associating users may include authenticating protocols, as described in more detail below, to confirm that the user is authorized to manage the device. Some devices may be monitored only and not actively managed, or may be managed by the cloud management service according to a preset or pre-defined configuration without user intervention if, for example, no authenticated user is associated with the device. Management of a device by an associated (and authenticated) user occurs via the cloud management service, which allows the detailed implementation (and the associated complexity and cost) of a user interface to be implemented in the cloud service rather than on the managed device. In part because the user management interface is provided by the cloud service, the user may be located anywhere in the world.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Various embodiments disclosed herein implement a cloud-based management system using one or more computer systems and one or more managed devices. As described further below, the cloud-based management system manages and monitors the operation of one or more managed devices. FIG. 1 illustrates an exemplary cloud-based management system 100. As shown, the cloud-based management system 100 includes a local user 102, a managed device 104, a local computer system 106, a cloud service infrastructure 108 including a cloud server 110, and a communication network 112. Also shown are a remote user 114 and a remote computer system 116. The cloud service infrastructure 108 may include additional components such as additional cloud servers, file servers, databases, etc. Although only one local user 102 and one local computer system 106, and only one remote user 114 and one remote computer system 116, is shown in FIG. 1, embodiments disclosed herein may interact with one or more users via one or more computer systems, such as additional local users, local computer systems, remote users, and remote computer systems. In addition, although only one managed device 104 is shown in FIG. 1, embodiments disclosed herein are not limited to a particular number of managed devices and several embodiments include multiple managed devices of various types. For instance, at least one embodiment includes cloud-enabled uninterruptible power supplies (UPS's) and cloud-enabled automatic control devices (ACD's). Various embodiments may include additional types of managed devices, examples of some of which are described further below.

Each of the managed device 104 and the cloud server 110 includes a network interface and memory for storing information. The cloud service infrastructure 108 and the managed device 104 exchange (i.e., send or receive) information via the network 112. For instance, the managed device 104 may transmit information, such as identification, configuration, environmental, control, or performance information, to the cloud service infrastructure 108 through the network 112. Conversely, the cloud service infrastructure 108 may transmit configuration or control information from, e.g., the cloud server 110, to the managed device 104 via the network 112. The network 112 may include any communication network through which computer systems exchange information. For example, the network 112 may be a public network, such as the internet, and may include other public or private networks such as LANs or WANs utilizing any suitable network communication technology.

The cloud-based management system 100 illustrated in FIG. 1 enables nearly ubiquitous access to centralized management and reporting of information from geographically diverse managed devices via cloud computing technology.

Some embodiments include managed devices (e.g., the managed device 104) that supply physical resources, such as power and cooling, to other equipment. Examples of the physical resources provided by these managed devices include generators, uninterruptible power supplies, transformers, power distribution units (PDU's), outlets, computer room air handlers (CRAH's), rack-mounted air conditioners (RMAC's) and computer room air conditioners (CRAC's). Additional embodiments of managed devices include specialized computing devices, such as ACDs, that are specifically configured to control one or more industrial processes and to communicate with a cloud service, such as the cloud service infrastructure 108. One example of an ACD that may be included in accord with the embodiments disclosed herein is described in U.S. Pat. No. 6,640,140, titled PLC EXECUTIVE WITH INTEGRATED WEB SERVER, issued Oct. 28, 2003, which is incorporated herein by reference in its entirety. Examples of UPS's that may be included in accord with the embodiments disclosed herein are described in U.S. Pat. No. 7,446,433, titled METHODS AND APPARATUS FOR PROVIDING UNINTERRUPTIBLE POWER, issued Nov. 4, 2008, and U.S. Pat. No. 8,476,787, titled SYSTEM AND METHOD FOR CHANGING POWER STATES OF A POWER DEVICE, issued Jul. 2, 2013, each of which is incorporated herein by reference in its entirety.

The managed devices disclosed here provide specific operations or functions that may be managed. These managed devices include enough computing resources to control the operation of the device, but the computing resources may be limited and tailored to support the specific operations performed by the managed device. In various embodiments, the cloud-based management system 100 allows management, local or remote, of managed devices with limited computing resources.

The managed devices disclosed herein may provide specific operations or functions by various hardware and software modules. For example, a UPS or any other managed device may have one or more AC power, DC power, battery, filter, inverter, and/or rectifier modules and may also have intelligence modules, controller modules, memory modules, display modules, diagnostic modules, reporting and/or statistical modules, or communications modules. Managed devices of various embodiments may have different or additional modules. Each module may provide an operation or function or set of operations or functions. The modules may be modular, i.e., removable or replaceable, or they may be integrated into a single unit.

Any module of a managed device may have operational parameters that indicate a status or affect specific functions or operations, and the operational parameters may be manageable, e.g., readable, writeable, monitorable, configurable, by a controller, processor, or other suitable element. Example operational parameters for a UPS may include modes of operation, e.g., bypass mode; alarm thresholds; sensor information or settings regarding input and output power, current, voltage, frequency, phase; sensor information or settings regarding positions or status of circuit breakers, bypass switches, and relays; battery bus voltage, fan operation, and internal temperatures. UPS's and other types of managed devices may have additional or alternate manageable operational parameters. Management of a managed device may include reading, writing, monitoring, or configuring any of these or other parameters, and management information may include any information or communication containing values of, or commands related to, such parameters.

Device Management

Figure 2:
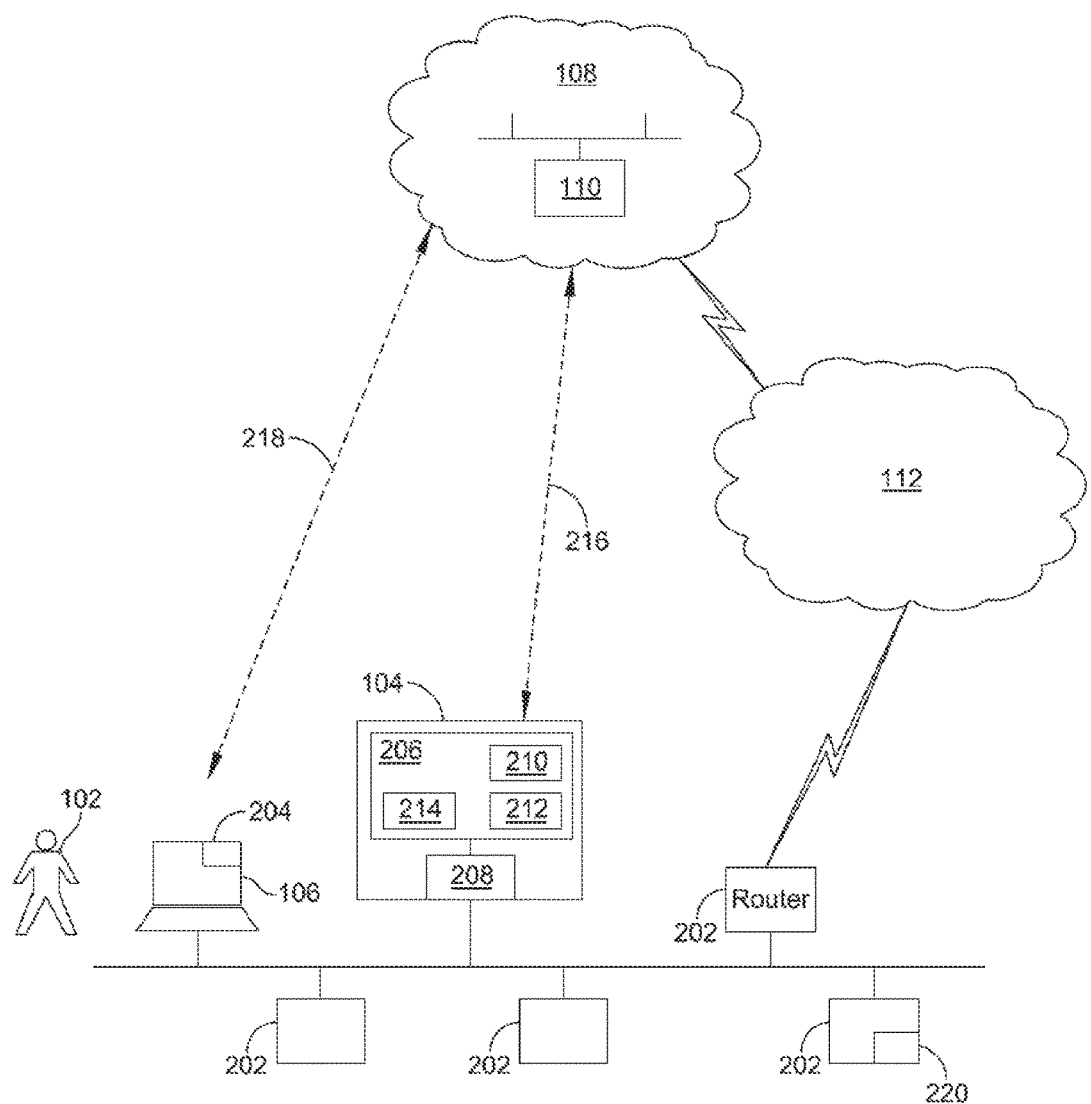
FIG. 2 is a schematic diagram of the cloud-based management system of FIG. 1 showing local detail at the managed device.

FIG. 2 illustrates the cloud-based management system 100 with more detail in the local vicinity of the managed device 104. The managed device 104 is on a local network to which various IT equipment 202 is attached. In a conventional management configuration, the local computer system 106 runs a management agent 204, which is a software package that provides monitoring and management capability. The management agent 204 typically manages a number of the various IT equipment 202. The management agent 204 typically supports protocols such as SNMP and directly communicates with the IT equipment 202. As discussed above, this conventional method requires a managed device to support the protocols used by the management agent 204.

In some embodiments, the management agent 204 may be an application downloaded from an app store and may be capable of being run on a mobile device, i.e., the computer system 106 may be a tablet or a smart phone, for example, and the computer system 106 may be connected by a wired or wireless connection, and the management conducted by the management agent 204 may be directed to a managed device on a local network or on a remote network.

At least one embodiment of the managed device 104 includes a controller 206 and a network interface 208. The controller 206 may control the managed device 104 in its primary operation and may also control communication, via the network interface 208, with other devices and systems, such as cloud service infrastructure 108. The controller 206 may also include a processor 210, a memory 212, and a storage 214. The memory 212 and the storage 214 may store executable instructions necessary for the operation of the managed device 104. The memory 212 and the storage 214 may also store information such as configuration settings, sensor or environmental data, statistical data, identifiers for various devices, such as the managed device 104 (itself) or the cloud service infrastructure 108, and any other suitable information. Examples of these components and the components more generally of devices such as the managed device 104, the computer systems 106, 116, the cloud server 110, and the various IT equipment 202 are discussed in more detail below with respect to FIG. 5.

In descriptions included herein, a device, such as the managed device 104, may be described as performing a function or communicating with other devices, and when the device performs the function or communicates with another device, a controller such as the controller 206, or a processor such as the processor 210, may be controlling or causing the function to be performed or the communication to be carried out. Accordingly, a description of a function or a communication being performed herein may equivalently be described as the device, the controller, or the processor performing the function or communication.

In at least one embodiment of the cloud-based management system 100, the managed device 104 need not support the protocols of the management agent 204 because the managed device 104 will not communicate directly with the management agent 204 and will instead communicate with the cloud service infrastructure 108 via a communication channel 216 across the network 112. The cloud service infrastructure 108 provides a protocol interface capable of communicating with the managed device 104. The cloud service infrastructure 108 also provides a protocol interface capable of communicating with the management agent 204 through a communication channel 218 across the network 112, such that the managed device 104 does not need to support such a protocol for, or communicate directly with, the management agent 204. In this manner, the cloud service infrastructure 108 communicates with the management agent 204 on behalf of the managed device 104, which may allow the managed device 104 to be manufactured and configured with less computing capability, at a lower cost, than it otherwise would have. This architecture also allows the cloud service infrastructure 108 to receive monitoring and management information about the managed device 104 that it otherwise may not have, and allows the cloud service infrastructure 108 to provide monitoring and management to the managed device 104 that it otherwise may not have.

In some embodiments, the cloud service infrastructure 108 will remotely communicate with the managed device 104 using a lightweight machine-to-machine (LWM2M) protocol. The managed device 104 and the cloud service infrastructure 108 may additionally or alternatively communicate using a representational state transfer (REST) protocol, simple object access protocol (SOAP), hypertext transfer protocol (HTTP) or any other suitable protocol.

Once communication is established between the managed device 104 and the cloud service infrastructure 108, the cloud service infrastructure 108 may request or be provided additional information from the managed device 104, and the cloud service infrastructure 108 may perform monitoring and management functions directed to the managed device 104. Additional information from the managed device 104 may include, but is not limited to, configuration information, hardware and firmware version numbers, optionally installed hardware, authorization and authentication information (e.g., security and encryption keys) to be discussed in more detail below, environmental information (e.g., temperature and humidity information), control information (e.g., information that triggers a function, such as a shutdown or self-test), performance information (e.g., efficiency, battery life), diagnostic information, alerts, and any other relevant information.

In some embodiments, the cloud service infrastructure 108 will communicate with the management agent 204 by serving web pages, for example using HTTP or HTTPS, to present a device management interface to the local user 102. The cloud service infrastructure 108 may additionally or alternatively communicate with the management agent 204 using SNMP or any other suitable protocol. In various embodiments, the cloud service infrastructure 108 will communicate with the management agent 204 using a protocol that requires more resources than those used to communicate with the managed device 104, thereby reducing the resources needed by the managed device 104 to be managed by the management agent 204.

In view of the various embodiments discussed above, the management agent 204 need not be aware that it is not communicating directly with the managed device 104. The management agent 204 may be configured to communicate with the cloud service infrastructure 108 as if the cloud service infrastructure 108 is the managed device 104. In similar fashion, the managed device 104 need not be aware that management instructions may be coming from the management agent 204. The managed device 104 may be configured such that the cloud service infrastructure 108 is the management entity, from the perspective of the managed device 104. The management agent 204 may be any suitable agent, such as a web browser or a commercial remote monitoring and management (RMM) software suite, for example. One such RMM known in the industry is VSA™ by Kaseya Limited.

Referring again to FIG. 1, a remote user 114 may also use a management agent 204 on the remote computer system 116 to manage the managed device 104 in the same manner as discussed above with regard to FIG. 2. Because the cloud service infrastructure 108 may appear to be the managed device 104 to the management agent 204, the management agent 204 may be located anywhere that has connectivity to the network 112.

Device Discovery

With continued reference to FIG. 2, in some embodiments the management agent 204 may be manually set up or configured to communicate with the cloud service infrastructure 108 by an express configuration. The express configuration may indicate that the management agent 204 is managing a managed device 104 through a cloud service infrastructure 108. Alternatively, the management agent 204 may be configured to communicate with the cloud service infrastructure 108 as if the cloud service infrastructure 108 were the managed device 104, which is to say that the management agent 204 is not aware that the cloud service infrastructure 108 is acting as a proxy, or providing protocol translation, if any, to allow management of the managed device 104.

In a similar fashion, the managed device 104 may be expressly configured to be managed by the management agent 204 through the cloud service infrastructure 108, or the managed device 104 may not be aware that it is communicating with a cloud service infrastructure 108, or the managed device 104 may not be aware that the management agent 204 is involved. In any of these cases, the management agent 204, the cloud service infrastructure 108, and/or the managed device 104 may be manually configured, pre-configured, or otherwise discover the other devices with which each is to communicate.

As discussed above, devices may be manually configured (e.g., at the time of installation) with information necessary to participate in a cloud-based management system 100. An alternative method includes the managed devices being cloud-enabled or cloud-aware, e.g., as a default configuration. Another alternative method includes using network device discovery techniques or tools. Example embodiments of device configuration methods are described below. An implementation of a cloud-based management system 100 as disclosed herein may include any one or more of these device configuration methods, and may include other methods.

In some embodiments, a managed device 104 will be cloud-enabled or cloud-aware from the manufacturer as a default configuration. In such embodiments, the managed device 104 is pre-configured with a network identifier to make contact with the cloud service infrastructure 108. The network identifier may include a URL, domain name, or IP address, or any combination of these identifiers or others. When the managed device 104 is connected to power and a network, and has a basic or default configuration sufficient to communicate over the network 112, the managed device 104 will attempt to establish a channel 216 to communicate with the cloud service infrastructure 108 using the network identifier. The managed device 104 will then provide to the cloud service infrastructure 108 identifying information representative of the managed device 104. Examples of identifying information representative of the managed device 104 include, but are not limited to, a device name, a serial number, a stock-keeping unit (SKU) number, a model number, an IP address, and a media access control (MAC) address of a network interface. In some embodiments the managed device 104 uses a combination of serial number and SKU to generate a unique identifier (UID). In some embodiments the managed device 104 uses a MAC address as a unique identifier.

In some embodiments, a network device discovery tool will be used to identify devices on a network. Shown in FIG. 2 is a discovery agent 220 with network connectivity to the IT equipment 202 and the managed device 104. The discovery agent 220 is a software or hardware tool that probes the local network to identify what devices are attached. An example device discovery tool is Nmap (Network Mapper), an open source utility known in the art. The discovery agent 220 may discover devices by passively listening to the network or by probing the network with discovery request messages. Probing the network may include probing a set of possible addresses with low layer protocols, such as Address Resolution Protocol (ARP) or Internet Control Message Protocol (ICMP) messages; probing with higher layer protocols, which may include support for a User Datagram Protocol (UDP) broadcast request for all devices to respond, if so configured; probing for well-known ports; or probing for a specific protocol, for example. The discovery agent 220 may discover devices by any one or a combination of these or other methods.

In some embodiments the discovery agent 220 requests an authorization token from the cloud service infrastructure 108 and broadcasts the authorization token on the local network. Potential managed devices, such as the managed device 104, may be configured to respond to the broadcast if they recognize the authenticity of the authorization token.

The discovery agent 220 may be included with the management agent 204 as a single software package capable of performing both discovery and management functions, or may be separate from the management agent 204. Additionally, the discovery agent 220 may be configured to communicate or gather information from another component, such as a third-party network discovery tool or a network management tool that holds information about the devices on the network.

The result of the discovery processes described is that the discovery agent 220 compiles a list of device identifiers, typically including MAC addresses and IP address, and possibly including port numbers, device names, and the like. In various embodiments, the discovery agent 220 may perform any combination of direct network probing, gathering information from other components, or other suitable methods of discovering devices on a network.

In some embodiments, the discovery agent 220 may be an application downloaded from an app store and may be capable of being run on a mobile device, such as a tablet or a smart phone, and the device associated with the discovery agent 220 may be connected to the network by a wired or wireless connection, and the discovery conducted by the discovery agent 220 may be directed to a local network or a remote network.

According to at least one embodiment, the discovery agent 220 communicates with the cloud service infrastructure 108 to provide a list of identifiers associated with the devices attached to the network. The cloud service infrastructure 108 sorts the list to identify devices of particular interest, devices that are interesting, and devices that are not of interest. The cloud service infrastructure 108 may also compile statistical data about the devices, such as number of devices, manufacturer identities, etc., and the cloud service infrastructure 108 may make the statistical data available to users 102, 114, or others. In other embodiments the management agent 204 may receive and sort the list, and may compile statistics. In various embodiments, the management agent 204 and the discovery agent 220 may each be part of the same hardware platform and/or the same software package running on a single computer system.

According to at least one aspect, the cloud-based management system 100 allows network management of managed devices, such as the managed device 104, that do not support direct management by a management agent, such as the management agent 204. Therefore, according to at least one embodiment, the cloud service infrastructure 108 may determine that devices capable of supporting direct management by a management agent are not of interest to the cloud service infrastructure 108. Whereas the cloud service infrastructure 108 may determine that devices of a certain manufacturer, or of a certain serial number or MAC address, are suited to management by the cloud service infrastructure 108 and therefore determine that such devices, e.g., managed device 104, are of interest and the cloud service infrastructure 108 may attempt to communicate with such devices to establish cloud based management. Other devices may be interesting because they are manufactured by competitors or provide capabilities of interest or may provide business opportunities for, e.g., service contracts, upgrade, or replacement, etc. and cloud service infrastructure 108 may therefor maintain a database of such devices for follow up with users, such as local user 102 and/or remote user 114.

In some embodiments, the cloud service infrastructure 108 uses the MAC addresses provided by the discovery agent 220 to determine the manufacturer of listed devices. A MAC address includes an Organizational Unit Identifier (OUI) which indicates the manufacturer of the network interface hardware, and by association may indicate the manufacturer of the device in which the interface hardware is a part. Additionally, in some embodiments the cloud service infrastructure 108 will include a database of MAC addresses for devices manufactured by one or more manufacturers. The database may further include the model number and/or serial number of the device associated with each MAC address. With a model number or serial number, the cloud service infrastructure 108 can identify the capabilities of the device, in some embodiments with queries to additional database information, to determine whether it is a device of particular interest, an interesting device, or a device that is not of interest.

Figure 3:
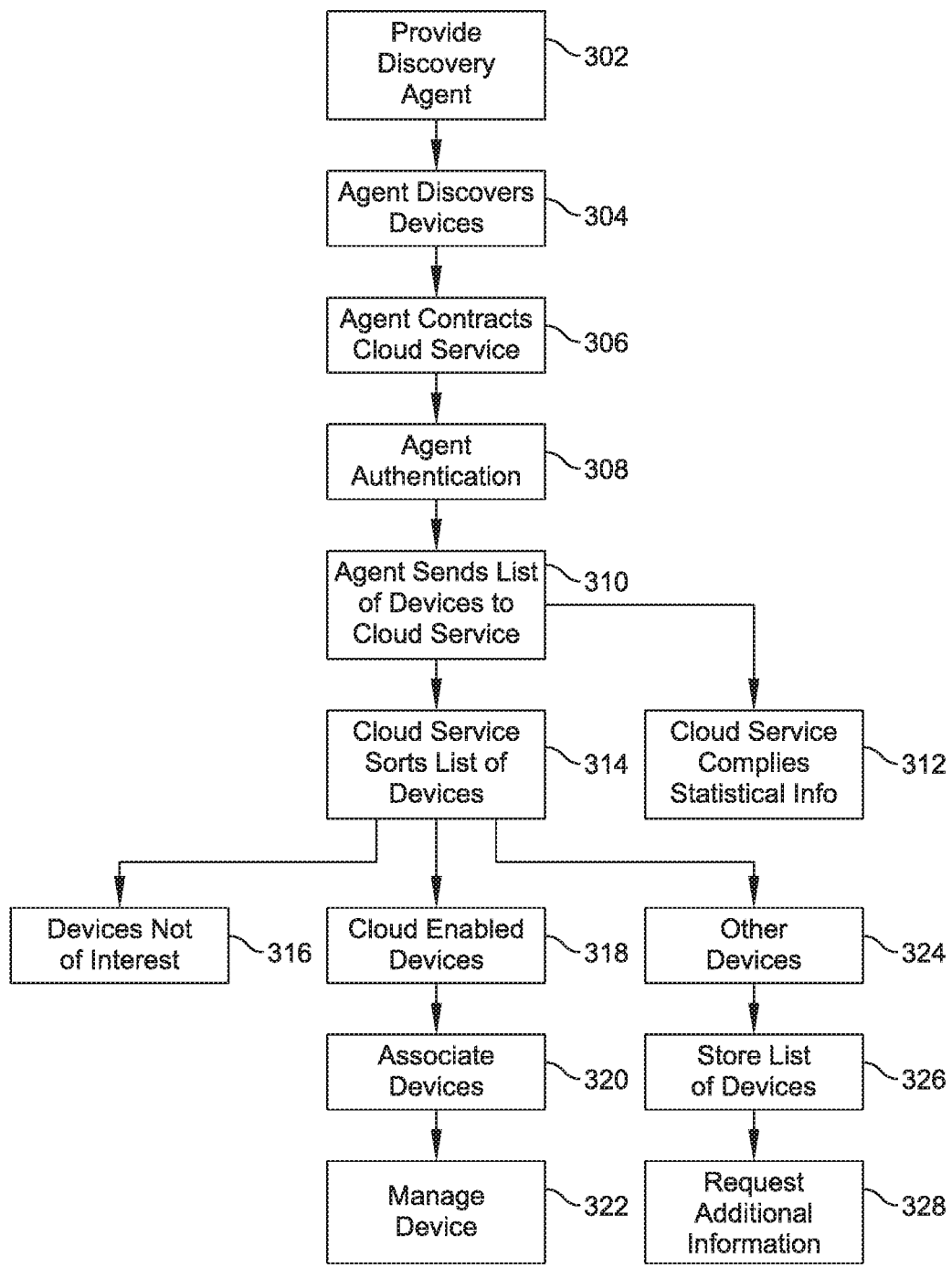
FIG. 3 is a flow diagram of a network discovery process in accord with the cloud-based management system.

FIG. 3 illustrates a flow diagram of a method 300 of discovering devices for cloud-based management discussed above and in accordance with various embodiments. The discovery agent 220 is provided at block 302 by, e.g, downloading and installing the discovery agent 220. The discovery agent 220 is executed and discovers devices on the network at block 304. The discovery agent 220 performs device discovery by direct probing or by gathering details from another tool, as discussed above, or by any combination of these or other methods. The discovery agent 220 contacts the cloud service infrastructure 108 via the network 112 at block 306 and sends a list of discovered devices to the cloud service infrastructure 108 at block 310. Additionally, the discovery agent 220 may authenticate itself at block 308 before sending the list of discovered devices. The cloud service infrastructure 108 will compile statistical information about the discovered devices at block 312 and will sort the discovered devices into groups at block 314. Devices that are not of interest may be identified but ignored at block 316. The cloud service infrastructure 108 identifies devices of particular interest, e.g., devices that may be managed by the cloud service infrastructure 108, at block 318 and the cloud service infrastructure 108 may attempt to associate and manage these devices at block 320 and block 322, respectively. Association of devices is discussed in more detail below. The cloud service infrastructure 108 also identifies other devices that are interesting at block 324 and may store a list of such devices at block 326 and may request additional information about these devices at block 328.

Authentication and Association/Pairing

Figure 4:
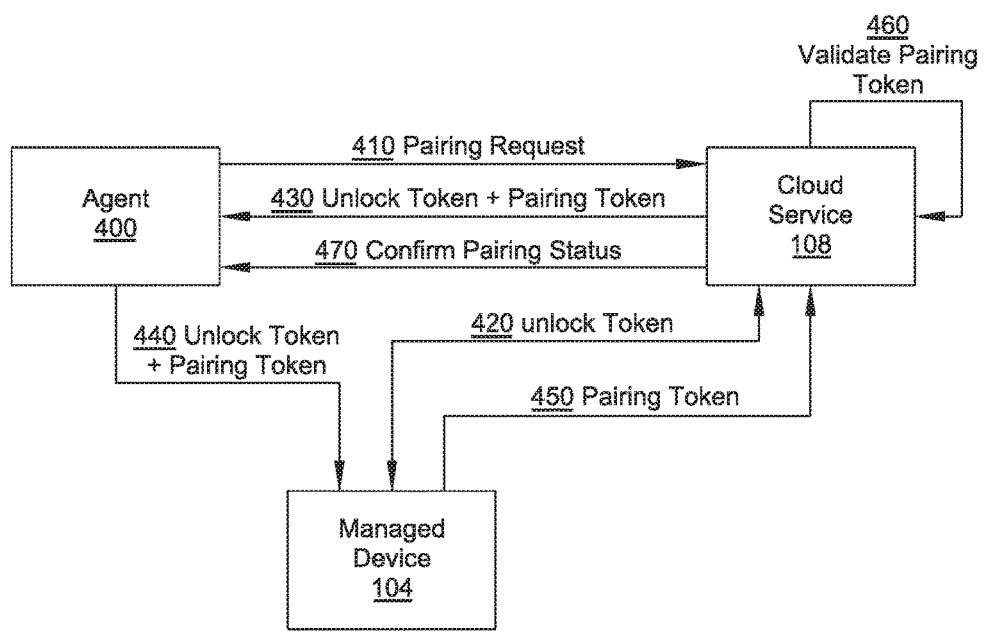
FIG. 4 is a schematic diagram of a pairing process showing message communications according to at least one embodiment.

FIG. 4 illustrates one embodiment of an interchange of messages that can authenticate and associate an owner or user of a device to be managed in a cloud-based management system. The interchange of messages illustrated in FIG. 4 associates or pairs the owner or user with the device to be managed, and the pairing may be recorded in a database maintained by the cloud service infrastructure 108. Shown in FIG. 4 is the cloud service infrastructure 108, the managed device 104, an agent 400, and a series of messages communicated via the network 112.

The agent 400 may be a management agent such as the management agent 204 of FIG. 2, or may be a discovery agent such as the discovery agent 220 of FIG. 2, or may be a combination of these or some other form of agent (implemented as software or hardware or a combination thereof) being used by a user, e.g., the local user 102 or the remote user 114. In at least one embodiment, the agent 400 is credentialed by the cloud service infrastructure 108. For example, the agent 400 may be provided by the same provider as the cloud service infrastructure 108 such that the agent 400 is trusted by the cloud service infrastructure 108, or the agent 400 may be a certified component from another provider, also trusted by the cloud service infrastructure 108, or the user, e.g., local user 102 or remote user 114, may provide credentials such as a username and password associated with an account maintained by the cloud service infrastructure 108. In some embodiments, one or more of these examples will serve to credential the agent 400.

The interchange of messages illustrated by FIG. 4 relates to creating an association (or pairing) of the managed device 104 to a user's (e.g., users 102, 114) account with the cloud service infrastructure 108. Additionally or alternatively, the agent 400 may be associated with the managed device 104 or the user. The example interchange of FIG. 4 begins with a pairing request 410 from the agent 400. The pairing request includes an identification of the managed device 104. The cloud service infrastructure 108 may optionally determine whether the user is authorized to associate this particular managed device 104 to the user, whether the managed device 104 is already associated with another user, whether it is permissible to be associated with multiple users, and whether the association will be trusted, e.g., whether the user is authorized to communicate on the local network or whether the user is able to communicate on the local network.

If the cloud service infrastructure 108 determines that proceeding is appropriate, the cloud service infrastructure 108 sends an unlock message 420 to the managed device 104 that includes an unlock token. Receipt of the unlock message 420 indicates to the managed device 104 that a pairing has been requested and that the paring is approved by the cloud service infrastructure 108. The cloud service infrastructure 108 also sends a pairing message 430 including both the unlock token and a pairing token to the agent 400. When the agent 400 receives the pairing message 430, the agent 400 sends an additional pairing message 440 to the managed device 104, including both the unlock token and the pairing token. The managed device 104 can validate the pairing message 440 by correlating it to the unlock message 420, because the unlock token provided in the pairing message 440 will match the unlock token provided in the unlock message 420. The managed device 104 sends a confirmation pairing message 450 to the cloud service infrastructure 108 that includes the pairing token. Each of the unlock token and the pairing token may be security tokens having cryptographic features, and may be random or pseudo-random, and may have timed expirations of any suitable amount of time, such as 5 minutes, for example. The cloud service infrastructure 108 may perform a validation 460 of the pairing token, such as by matching it to the pairing token sent in the pairing message 430, which was previously sent in response to the pairing request 410. The validation 460 may include sending additional messages internal or external to the cloud service infrastructure 108, such as for a database query. Upon validating the received pairing token the cloud service infrastructure 108 also records an entry in the database that the user, or optionally the agent 400, is now associated, or paired, with the managed device 104, and the cloud service infrastructure 108 sends a confirmation message 470 to the agent 400. The agent 400 may indicate to the user that the pairing was successful.

In various embodiments, the result of the process discussed above is that the managed device 104 becomes associated, or paired, with the user's account or with the agent 400. As a result, the user or the agent 400 may now manage, monitor, generate reports, receive alerts, etc. with respect to managed device 104, or perform or use other tasks, components, or features within the capabilities of the cloud service infrastructure 108 or the managed device 104 as permitted by any permissions, groups, roles, or profiles imposed by the cloud service infrastructure 108 or the cloud-based management system 100.

While the process discussed above is an exemplary interchange of messages to associate, or pair, a user (or agent) to a managed device in at least one embodiment, other embodiments may use different types or arrangements of messages. For example, while the cloud service infrastructure 108 is shown as making first contact with the managed device 104 in the example process of FIG. 4, in some embodiments the managed device 104 may first contact the cloud service infrastructure 108, on its own accord or in response to a request from the agent 400. Such an embodiment may be desirable in cases where, for example, the managed device 104 is shielded from the network 112 by a firewall or a device implementing network address translation (NAT), which might prevent the cloud service infrastructure 108 from initiating communication with the managed device 104. In various embodiments, the managed device 104 may generate the tokens used in the pairing process, or the agent 400 may generate the tokens used in the pairing process. In various embodiments, execution of a discovery process such as those described previously, and in particular a discovery process including an authorization token, may trigger a pairing request or may be treated as a pairing request by, e.g., the managed device 104, or the cloud service infrastructure 108.

In various embodiments, the agent 400 may send a list of device UID's, each UID uniquely identifying one device, such as the managed device 104, and the list of multiple devices may be deemed by the cloud service infrastructure 108 to be a request for pairing to each of the devices, and the cloud service infrastructure 108 may generate multiple unlock tokens and paring tokens to complete multiple pairings in accord with any of the processes discussed above.

While the processes described above may result in pairing the managed device 104 with the user 102 and/or the management agent 204, in some embodiments the pairing is achieved during the discovery process previously described. For example, during the discovery process a list of one or more UID's may be provided to the cloud service infrastructure 108, as previously described. The cloud service infrastructure 108 may know the identity of a user, an owner, or a network on which the devices are connected and thereby associate (or pair) the devices with the user, owner, or network. For example, the cloud service infrastructure 108 may associate the identified devices with an identifier of the agent or user (e.g., IP address or account information associated the management agent 204, the discovery agent 220, or the user 102). Additionally, the UID of a device may indicate what user or agent it should be associated with or where it is located. For example, the UID may include a serial number or MAC address, and a database of sales records may indicate who purchased the device. Alternately, the UID or the communication packet in which it is communicated may include an IP address which may identify a network, include a network portion, or otherwise identify a group of related devices (e.g., on the same LAN) and the cloud service infrastructure 108 may associate the identified devices with an agent or user on record as being associated with the network, portion, or group.

Once the cloud service infrastructure 108 is in communication with the managed device 104, which may optionally occur with or without the authentication and pairing described above, the cloud service infrastructure 108 can exchange a variety of information with the local user 102, the remote user 114, or an internal user associated with the cloud service infrastructure 108. For instance, in at least one embodiment, the cloud service infrastructure 108 provides a dashboard user interface. In other embodiments, the cloud service infrastructure 108 may present a user interface that mimics existing hardware and software interfaces (e.g., the interface provided by a Network Management Card ("NMC") such as a UPS NMC available from APC by Schneider Electric, the interface provided by Power Chute Business Edition available from APC by Schneider Electric, or the interface provided by an ACD.)

In some embodiments, the cloud service infrastructure 108 is configured to issue an alert to a computer system, such as the local computer system 106, in response to receiving information describing an event of high importance. In these embodiments, the alert issued by the cloud service infrastructure 108 is communicated via one or more channels through which the cloud service infrastructure 108 can communicate information to external entities, such as computer systems or telecommunication devices. Examples of such channels include email, text messaging, push notifications, and automated telephone calls.

In some embodiments, the cloud service infrastructure 108 provides different information to different types of users. The cloud service infrastructure 108 may discriminate what information to share based upon authentication and pairing as described above. This information may include monitoring information describing the performance characteristics of one or more managed devices, test information generated from periodic execution of tests by one or more managed devices, customer use information generated by customer interaction with one or more managed devices, service information generated by self-diagnostic activities executed by one or more managed devices, and operation information generated by operational activity of one or more managed devices. In some embodiments, the cloud service infrastructure 108 may provide performance characteristics to engineering users, customer use information to marketing users, service information to re-sellers, distributors, or service organizations, and operation information to customers. Further examples of protocols and communications with and about managed devices that may be incorporated into embodiments herein are described in U.S. Pat. No. 8,819,170 titled COMMUNICATION PROTOCOLS, issued Aug. 26, 2014, and U.S. Patent Application Publication No. 2015/0012763 titled SYSTEMS AND METHODS OF REMOTE COMMUNICATION, published Jan. 8, 2015, each of which is incorporated herein by reference in their entirety for all purposes.

Embodiments disclosed herein are not limited to the particular configurations illustrated. For example, some embodiments include multiple cloud services that operate in parallel to scale the computing resources available to the cloud-based management system. In some examples, multiple users of different types access the same managed device. In other examples, a single user accesses multiple managed devices. Thus embodiments are not limited by a specific number of users, managed devices, cloud services or cloud servers.

In addition, various embodiments utilize a variety of hardware components, software components and combinations of hardware and software components configured to perform the processes and functions described herein. For instance, in at least one embodiment, the cloud service infrastructure 108 is implemented as a consolidated computer system, e.g., all components incorporated into cloud server 110. In other embodiments, the cloud service infrastructure 108 is implemented using a distributed computer system.

Various aspects and functions described herein may be included as specialized hardware or software components executing in one or more computer systems. One or more acts of the methods described above may be performed with a computer, where at least one act is performed in a software program housed in a computer. Non-limiting examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
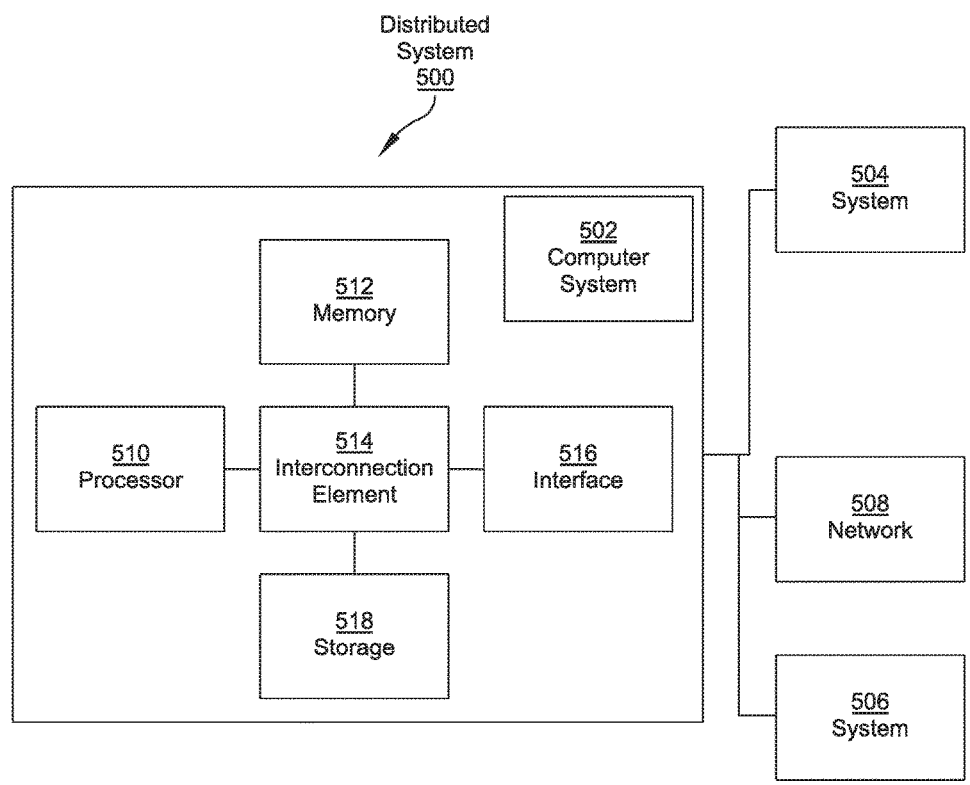
FIG. 5 is a schematic diagram of a computer system in accord with aspects and embodiments disclosed herein.

Referring to FIG. 5, there is illustrated a block diagram of a distributed computer system 500, in which various aspects and functions are practiced. As shown, the distributed computer system 500 includes one or more computer systems that exchange information. More specifically, the distributed computer system 500 includes computer systems/devices 502, 504 and 506. As shown, the computer systems/devices 502, 504 and 506 are interconnected by, and may exchange data through, a communication network 508. The network 508 may include any communication network through which computer systems may exchange data. To exchange data using the network 508, the computer systems/devices 502, 504 and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 may transmit data via the network 508 using a variety of security measures including, for example, TLS, SSL or VPN. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage element 518. To implement at least some of the aspects, functions and processes disclosed herein, the processor 510 performs a series of instructions that result in manipulated data. The processor 510 may be any type of processor, multiprocessor or controller. Some example processors include commercially available processors such as an Intel Atom, Itanium, Core, Celeron, or Pentium processor, an AMD Opteron processor, an Apple A4 or A5 processor, a Sun UltraSPARC or IBM Power5+ processor and an IBM mainframe chip. The processor 510 is connected to other system components, including one or more memory devices 512, by the interconnection element 514.

The memory 512 stores programs and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include one or more physical busses, for example, busses between components that are integrated within a same machine, but may include any communication coupling between system elements including specialized or standard computing bus technologies such as IDE, SCSI, PCI and InfiniBand. The interconnection element 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

The computer system 502 as generally described provides one or more examples of the physical embodiments of a system that may be used to implement the various devices and components of the cloud-based management system 100. In particular, each of the managed device 104, the local computer system 106, the remote computer system 116, the various IT equipment 202, and components of the cloud service infrastructure 108, including the cloud server 110, may be implemented using a combination of the hardware structures as disclosed herein as the example computer system 502.

Although the computer system 502 is shown by way of example as one type of computer system upon which various aspects and functions may be practiced, aspects and functions are not limited to being implemented on the computer system 502. Various aspects and functions may be practiced on one or more computers having a different architectures or components than that shown in FIG. 5. For instance, the computer system 502 may include specially programmed, special-purpose hardware, such as an application-specific integrated circuit ("ASIC") tailored to perform a particular operation disclosed herein. While another example may perform the same function using a grid of several computing devices running MAC OS X with IBM PowerPC processors and several specialized computing devices running proprietary hardware and operating systems.

The computer system 502 may be a computer system including an operating system that manages at least a portion of the hardware elements included in the computer system 502. In some examples, a processor or controller, such as the processor 510, executes an operating system. Examples of a particular operating system that may be executed include a Windows-based operating system, such as the Windows 8 operating system, available from the Microsoft Corporation, a MAC OS X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A managed device comprising:
at least one module configured to provide manageable operations of the managed device;
a network interface; and
a controller coupled to the network interface and the at least one module and configured to
establish communication with a cloud service via the network interface,
send an identifier of the managed device to an agent via the network interface,
receive a first unlock token from the cloud service,
receive a second unlock token from the agent,
receive a pairing token from the agent,
validate the second unlock token using the first unlock token,
provide the pairing token to the cloud service based upon a successful validation of the second unlock token using the first unlock token, and
receive management information from the agent via the cloud service.

2. The managed device of claim 1 wherein the controller is further configured to control the at least one module based on the management information.

3. The managed device of claim 1 wherein the controller is further configured to receive authorization from a user before at least one of establishing communication, sending an identifier, and validating the second unlock token using the first unlock token.

4. The managed device of claim 1 wherein communication with the cloud service occurs using a first protocol that is a machine-to-machine protocol.

5. The managed device of claim 1 wherein the first unlock token, the second unlock token, or the pairing token includes at least one of a cryptographic token and a timed token.

6. The managed device of claim 1 wherein the controller is further configured to send a confirmation to at least one of the cloud service or the agent, based upon successfully validating the second unlock token using the first unlock token.

7. The managed device of claim 1 wherein the controller is further configured to send the identifier of the managed device in response to a discovery message received from at least one of the cloud service or the agent.

8. A method of managing a managed device, the method comprising:
establishing communication, by the managed device, with a cloud service, via a network interface;

sending, by the managed device, an identifier of the managed device to an agent via the network interface;

receiving, by the managed device, a first unlock token from the cloud service;

receiving, by the managed device, a second unlock token from the agent;

receiving, by the managed device, a pairing token from the agent;

validating the second unlock token using the first unlock token, by the managed device;

providing the pairing token to the cloud service based upon a successful validation of the second unlock token using the first unlock token; and receiving management information, by the managed device, from the agent via the cloud service.

9. The method of claim 8 further comprising controlling an operation of the managed device based on the management information.

10. The method of claim 8 wherein at least one of establishing communication, sending an identifier, and validating the second unlock token using the first unlock token is contingent upon receiving authorization from a user.

11. The method of claim 8 wherein receiving management information from the cloud service occurs using a first protocol that is a machine-to-machine protocol.

12. The method of claim 8 wherein the first unlock token, the second unlock token, or the pairing token includes at least one of a cryptographic token and a timed token.

13. The method of claim 8 further comprising sending, by the managed device, a confirmation to at least one of the cloud service or the agent, based upon successfully validating the second unlock token using the first unlock token.

14. The method of claim 8 wherein sending the identifier of the managed device is in response to a discovery message received from at least one of the cloud service or the agent.

15. A method of managing a managed device, the method comprising:

receiving, over a network, an identifier of the managed device;

receiving, over the network, from an agent, a request to pair with the managed device;

providing, over the network, an unlock token to the managed device, responsive to receiving the request to pair with the managed device;

providing, over the network, the unlock token and a first pairing token to the agent, responsive to receiving the request to pair with the managed device;

receiving, over the network, a second pairing token from the managed device;

validating the second pairing token using the first pairing token;

associating the agent with the managed device responsive to a successful validation of the second pairing token using the first pairing token;

receiving management information over the network, from the agent, using a first protocol; and providing the management information over the network to the managed device using a second protocol different from the first protocol.

16. The method of claim 15 wherein the unlock token, the first pairing token, or the second pairing token includes at least one of a cryptographic token and a timed token.

17. The method of claim 15 wherein the first protocol is one of a network management protocol and a hypertext transfer protocol and the second protocol is a machine-to-machine protocol.

18. The method of claim 15 wherein associating the agent with the managed device includes authenticating a user of the agent.

19. The method of claim 15 wherein associating the agent with the managed device includes determining capabilities of the managed device.

* * * * *